United States Patent
Jeong et al.

(10) Patent No.: US 6,514,360 B2
(45) Date of Patent: Feb. 4, 2003

(54) METHOD FOR MANUFACTURING A TUBE AND A SHEET OF NIOBIUM-CONTAINING ZIRCONIUM ALLOY FOR A HIGH BURN-UP NUCLEAR FUEL

(75) Inventors: Yong Hwan Jeong, Taejon-si (KR); Jong Hyuk Baek, Taejon-si (KR); Byoung Kwon Choi, Taejon-si (KR); Kyeong Ho Kim, Taejon-si (KR); Myung Ho Lee, Taejon-si (KR); Sang Yoon Park, Taejon-si (KR); Cheol Nam, Taejon-si (KR); Younho Jung, Taejon-si (KR)

(73) Assignees: Korea Atomic Energy Reserach Institute, Taejon-si (KR); Korea Electric Power Corporation, Seoul (KR)

( * ) Notice: Subject to any disclaimer, the term of this patent is extended or adjusted under 35 U.S.C. 154(b) by 0 days.

(21) Appl. No.: 09/852,953

(22) Filed: May 10, 2001

(65) Prior Publication Data

US 2002/0136347 A1 Sep. 26, 2002

(30) Foreign Application Priority Data

Jan. 19, 2001 (KR) .......................................... 2001-3273

(51) Int. Cl.⁷ .................................................. C22F 1/18
(52) U.S. Cl. ........................ 148/668; 148/672; 148/407; 148/421
(58) Field of Search ................................. 148/557, 668, 148/672, 407, 421

(56) References Cited

U.S. PATENT DOCUMENTS

| | | | | |
|---|---|---|---|---|
| 5,618,356 A | * | 4/1997 | Adamson et al. | 148/519 |
| 5,622,574 A | * | 4/1997 | Charquet | 148/519 |
| 5,648,995 A | | 7/1997 | Mardon et al. | |
| 5,940,464 A | * | 8/1999 | Mardon et al. | 148/672 |
| 6,014,418 A | | 1/2000 | Isobe et al. | |
| 6,125,161 A | * | 9/2000 | Isobe et al. | 148/672 |

* cited by examiner

Primary Examiner—John Sheehan
Assistant Examiner—Andrew L. Oltmans
(74) Attorney, Agent, or Firm—Bachman & LaPointe, P.C.

(57) ABSTRACT

Disclosed is a method for manufacturing a tube and a sheet of niobium-containing zirconium alloys for the high burn-up nuclear fuel. The method comprises melting Nb-added zirconium alloy to ingot; forging the ingot at β phase range; β-quenching the forged ingot after solution heat-treatment at 1015–1075° C.; hot-working the quenched ingot at 600–650° C.; cold-working the hot-worked ingot in three to five passes, with intermediate vacuum annealing; and final vacuum annealing the cold-worked ingot at 440–600° C., wherein temperatures of intermediate vacuum annealing and final vacuum annealing after β-quenching are changed so as to attain the condition under which precipitates in the alloy matrix are limited to an average diameter of 80 nm or smaller and the accumulated annealing parameter ($\Sigma$ A) is limited to $1.0 \times 10^{-18}$ hr or lower.

11 Claims, 7 Drawing Sheets

FIGURES

| After Hot Working at 630°C | | |
| After 1st Cold Working | | |
| After 2nd Cold Working | | |
| | Nb 0.4 %, Sn 0.8 %, Fe 0.35 %, Cr 0.15 %, Mn 0.1 %, Si 120 ppm, O 1400 ppm and Zr balance | Nb 0.2 %, Sn 1.1 %, Fe 0.35 %, Cr 0.15 %, Cu 0.1 %, Si 120 ppm, O 1400 ppm and Zr balance |

(a) $\Sigma A=3.95\times10^{-20}$ hr (b) $\Sigma A=4.09\times10^{-19}$ hr (c) $\Sigma A=3.35\times10^{-17}$ hr

METHOD FOR MANUFACTURING A TUBE AND A SHEET OF NIOBIUM-CONTAINING ZIRCONIUM ALLOY FOR A HIGH BURN-UP NUCLEAR FUEL

FIELD OF THE INVENTION

The present invention pertains to a method for manufacturing a tube and a sheet of niobium-containing zirconium alloys for high burn-up nuclear fuel, comprising melting a metal mixture comprising of zirconium and alloying elements to obtain an ingot, forging the ingot at β phase range, β-quenching the forged ingot in water after a solution heat-treatment at 1015–1075° C., hot-working the quenched ingot at 600–650° C., cold-working the hot-worked ingot in three to five times with intermediate vacuum annealing, and final vacuum annealing the cold-worked ingot at 440–600° C.

BACKGROUND OF INVENTION

In the development of nuclear reactors, such as pressurized water reactors (PWR) and boiling water reactors (BWR), zirconium alloys have been widely used in nuclear reactor applications, including nuclear fuel cladding, nuclear fuel assembly components, and reactor core components.

Among zirconium alloys developed up to now, Zircaloy-2 (Sn: 1.20–1.70%, Fe: 0.07–0.20%, Cr: 0.05–1.15%, Ni: 0.03–0.08%, O: 900–1500 ppm, Zr: the balance) and Zircaloy-4 (Sn: 1.20–1.70%, Fe: 0.18–0.24%, Cr: 0.07–1.13%, O: 900–1500 ppm, Ni:<0.007%, Zr: the balance), which include Sn, Fe, Cr and Ni, have been widely used. (Herein, % means % by weight).

Recently, the high burn-up/extended cycle nuclear fuels have been used to improve economic efficiency of nuclear reactors. In the case of the conventional Zircaloy-2 and Zircaloy-4, many problems are caused in terms of corrosion and mechanical properties. Hence, Nb known to be used in improving mechanical strength and creep resistance, as well as improving corrosion resistance of zirconium alloy and low hydrating, is added to zirconium alloys used for fuel cladding and space grids of the high burn-up/extended cycle nuclear fuel.

An important factor affecting corrosion and mechanical properties in zirconium alloys is the chemical composition of the alloy and also its amount. However, corrosion and mechanical properties of zirconium alloys having the same composition are greatly changed depending on annealing conditions and working degree.

In particular, physical properties of Nb-containing zirconium alloys depend on the manufacturing processes, so that the optimal manufacturing processes should be established.

In the prior arts related to manufacturing processes of Nb-containing zirconium alloys useful as cladding rods of high burn-up/extended cycle nuclear fuels, U.S. Pat. No. 5,648,995 refers to a method for manufacturing cladding tubes made out of zirconium alloys containing Nb: 0.8–1.3 wt %, Fe: 50–250 ppm, O: 1600 ppm or less, C: 200 ppm or less, Si: 120 ppm or less. In this patent, an ingot of Nb-containing zirconium alloy is heated to between 1000° C. and 1200° C., β-quenched in water, heated to the range of 600° C. to 800° C. and then extruded. Thereafter, cold rolling is conducted in four to five passes with intermediate heat treatments in the range 565° C. to 605° C. for 2–4 hours and a final heat treatment is performed at 580° C., thereby manufacturing cladding tubes of nuclear fuels. As such, in order to improve creep resistance, Fe in the alloy composition is limited to an amount of 250 ppm or less, and O is limited to the range of 1000–1600 ppm.

U.S. Pat. No. 5,940,464 discloses a method of manufacturing alloys comprising Nb: 0.8–1.8 wt %, Sn: 0.2–0.6 wt %, Fe: 0.02–0.4 wt %, C: 30–180 ppm, Si: 10–120 ppm, O: 600–800 ppm and Zr the balance. The bars of alloys are heated at 1000–1200° C. and then quenched. The melted bar is drawn into a blank after heating to a temperature in the range of 600° C. to 800° C., followed by annealing the drawn blank at a temperature in the range 590° C. to 650° C. The annealed blank is cold-worked in at least four passes into a tube, with intermediate heat treatments at temperatures in the range 560° C. to 620° C. Next, a final heat treatment step for recrystallization at a temperature in the range 560° C. to 620° C., and a final heat treatment step for stress relief at 470–500° C., are carried out.

U.S. Pat. No. 5,838,753 refers to a process for fabricating a nuclear fuel cladding tube, comprising β-quenching a zirconium alloy billet comprising of Nb 0.5–3.25% and Sn 0.3–1.8% by heating to a temperature in the βrange above 950° C. and rapidly quenching the billet below a transformation temperature from α+β to α to form a martens tic structure, extruding the billet at below 600° C., forming a hollow, annealing the said hollow by heating at a temperature up to 590° C., pilgering the said annealed hollow, and finally annealing at a temperature up to 590° C. to form the said cladding tube for nuclear fuel. This patent also comprises of the alloy having a microstructure of second phase precipitates of β-niobium distributed uniformly, intragranularly and intergranularly forming radiation resistant second phase precipitates in the alloy matrix so as to increase the resistance to aqueous corrosion, compared to that of Zircaloy, when irradiated to high fluency. The β-quenching step is conducted below 250° C. at a cooling rate greater than about 300 K/sec, and the second phase precipitates in the alloy have an average diameter of 80 nm. In the alloy further comprising Si: 150 ppm or less, C: 50–200 ppm and 0: 400–1000 ppm, the second phase precipitates have an average diameter of 60 nm.

EP 0 198 570 B1 relates to a process for fabricating a thin-wall tube (less than 1 mm in thickness) from 1.0–2.5 wt % of Nb-added zirconium alloy selectively containing Cu, Fe, Mo, Ni, W, V, and Cr as well as homogeneously and finely dispersed particles formed by β-treating a niobium-containing zirconium alloy billet; extruding the said β-treated billet at a temperature less than 650° C. to form a tube shell; further deforming the said tube shell by cold working the same in a multiple of cold working stages; annealing the said tube shell, between the stages of the cold working, at a temperature below 650° C.; and finally annealing the resultant tube at a temperature below 600° C., so as to control a microstructure of the material having the niobium-containing particles of a size below about 80 nm homogeneously dispersed therein. The 1–2.5 wt % Nb-added alloys are extruded, annealed at 500–600° C., preferably 524° C. for 7.5 hours, and then finally annealed at 500° C., preferably 427° C. for 4 hours. The tube shell after extrusion is β-annealed at 850–1050° C. and then quenched.

Additionally, U.S. Pat. No. 5,230,758 discloses that zirconium alloy comprising Nb: 0.5–2.0 wt %, Sn: 0.7–1.5 wt %, Fe: 0.07-0.14 wt %, Cr: 0.025-0.08 wt %, Cr—Ni 321 ppm or less, 0.03–0.14 wt % of at least one of Cr and Ni, at least 0.12 wt % total of Fe, Cr and Ni, C: 220 ppm or less, is subjected to a post extrusion annealing and a series of fabrication step. Intermediate annealing temperature is 645–704° C. and the alloy is subjected to β-quenching two steps prior to a final sizing.

Therefore, under study has been the method of making Nb-containing zirconium alloys for high burn up/extended cycle nuclear fuel with improving the corrosion resistance and strength by changing the kind and amount of added elements and conditions of working and annealing.

SUMMARY OF THE INVENTION

Leading to the present invention, the intensive and thorough research on a novel method for manufacturing Nb-containing zirconium alloys with excellent corrosion resistance and mechanical properties, carried out by the present inventors aiming to avoid the problems encountered in the prior arts, resulted in the finding that added elements are changed in kinds and amounts, and also cold working is conducted 3–5 times, annealing being performed at relatively low temperatures, and average size and annealing conditions of precipitates in the alloy matrix are quantitatively determined by use of the accumulated annealing parameter ($\Sigma$ A), thereby developing an optimized method for manufacturing zirconium alloys comprising 0.05–1.8% of niobium and Sn, Fe, Cr, Mn, and Cu for nuclear fuel cladding tube.

Therefore, it is an object of the present invention to provide a method for manufacturing a tube and a sheet of Nb-containing zirconium alloys with excellent corrosion resistance and mechanical properties, useful as high burn up/extended cycle nuclear fuel.

BRIEF DESCRIPTION OF THE DRAWINGS

The above and other objects, features and other advantages of the present invention will be more clearly understood from the following detailed description taken in conjunction with the accompanying drawings, in which.

———Nb 0.4 wt %, Sn 0.8 wt %, Fe 0.35 wt %, Cr 0.15 wt %, Mn 0.1 wt %, Si 120 ppm, O 1400 ppm and Zr the balance (hereinafter, abbreviated to 'A composition');

-----Nb 0.2 wt %, Sn 1.1 wt %, Fe 0.35 wt %, Cr 0.15 wt %, Cu 0.1 wt %, Si 120 ppm, O 1400 ppm and Zr the balance (hereinafter, abbreviated to 'B composition');

Nb 1.5 wt %, Sn 0.4 wt %, Fe 0.2 wt %, Cr 0.1 wt %, Si 120 ppm, O 1400 ppm and Zr the balance (hereinafter, abbreviated to 'C composition');

—·—·—Nb 1.0 wt %, Sn 1.0 wt %, Fe 0.3 wt %, Cr 0.1 wt %, Cu 0.1 wt %, Si 120 ppm, O 1400 ppm and Zr the balance (hereinafter, abbreviated to 'D composition');

Nb 0.4 wt %, Sn 0.8 wt %, Fe 0.35 wt %, Cr 0.15 wt %, Cu 0.1 wt %, Si 120 ppm, O 1400 ppm and Zr the balance (hereinafter, abbreviated to 'E composition').

Figure 5:
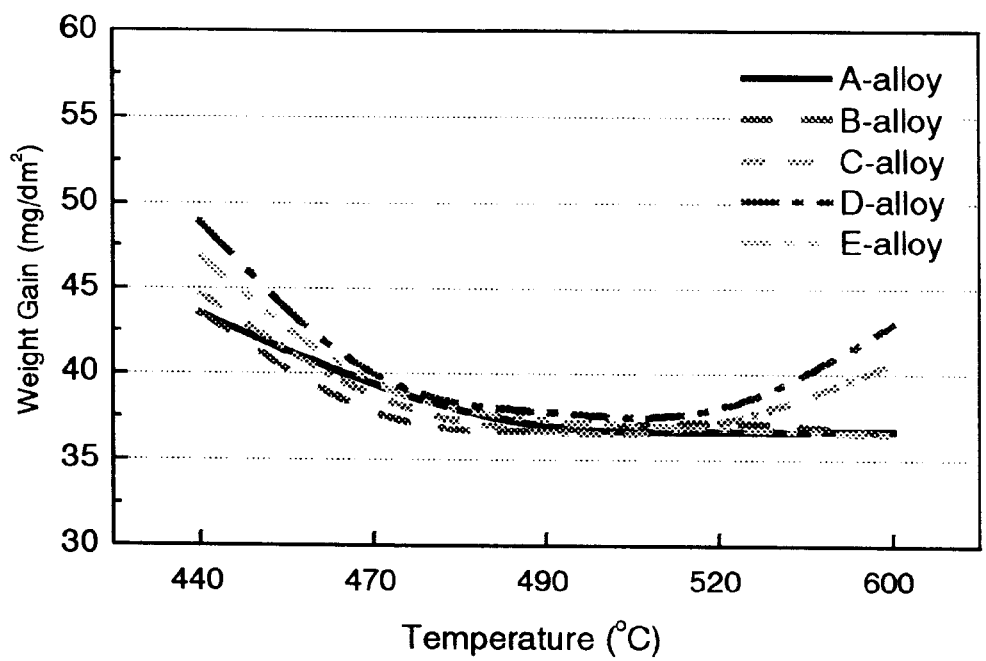
Figure 6:
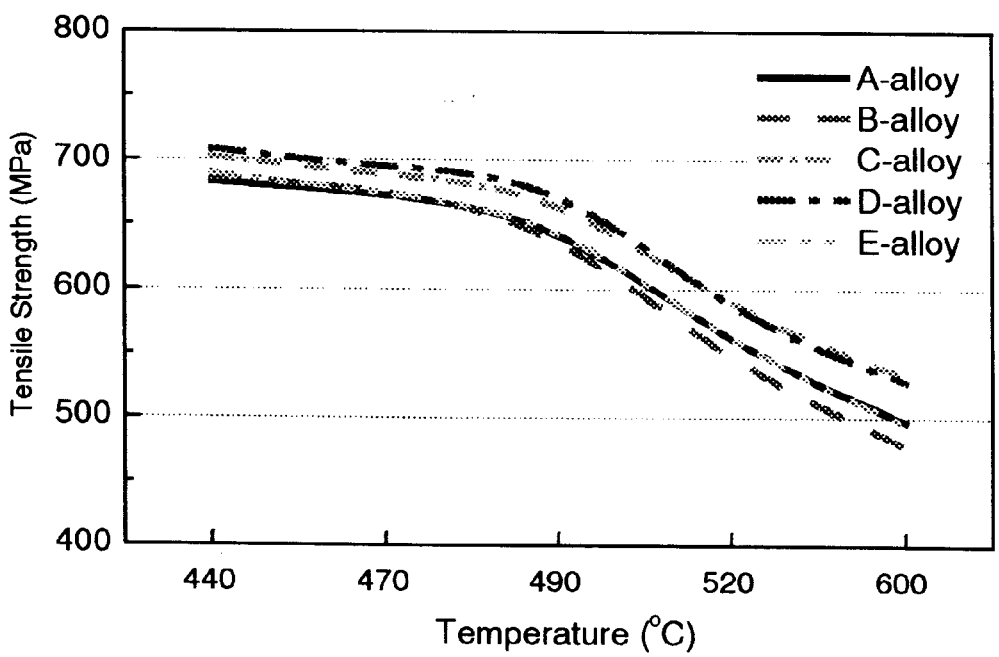
Figure 7:
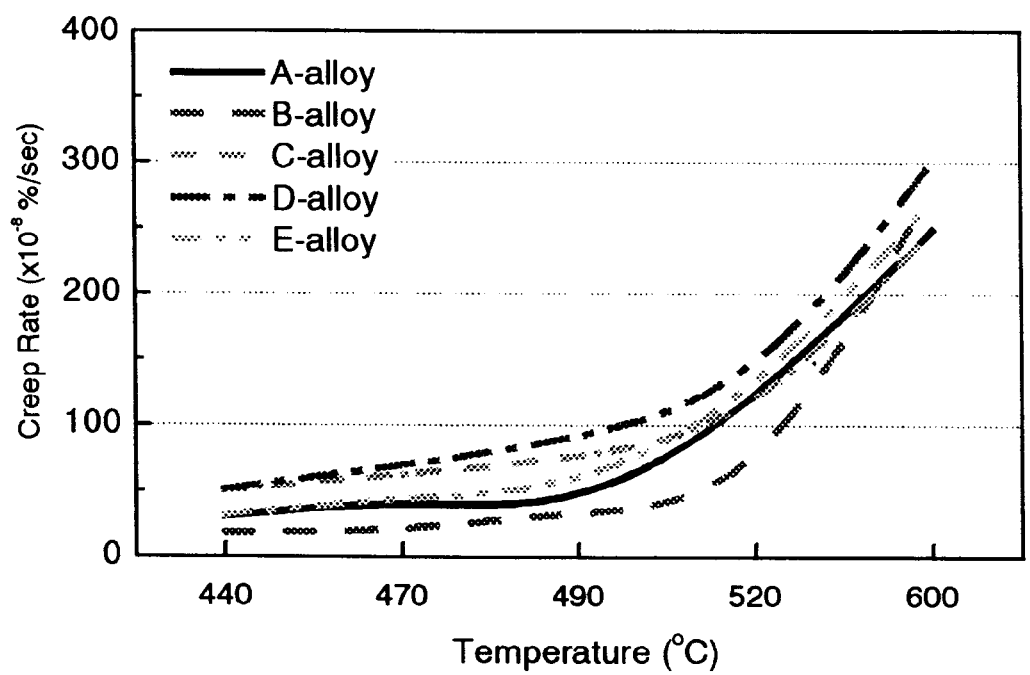
Figure 8:
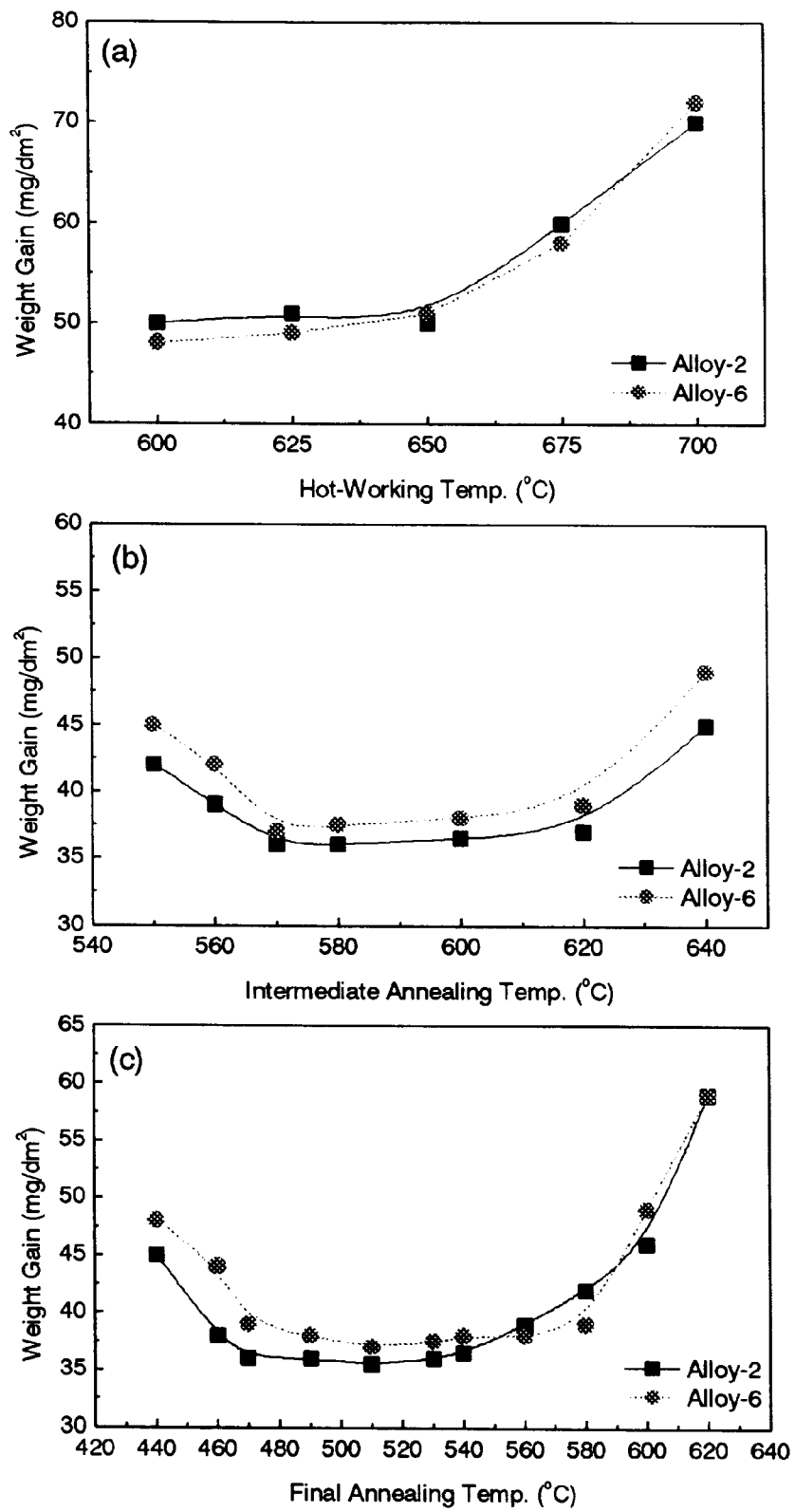

FIG. 5 is a graph showing corrosion properties of alloys according to final annealing temperature. ———A; -----B; C; —·—·—D; E FIG. 6 is a graph showing tensile strength of alloys according to final annealing temperature. ———A; -----B; —·—·—C; D; E FIG. 7 is a graph showing creep rate of alloys according to final annealing temperature. ———A; -----B; —·—·—C; D; E FIG. 8 is a graph showing corrosion properties of the Alloy-2 and Alloy-6 according to the temperatures of hot-working, intermediate annealing, and final annealing.

DETAILED DESCRIPTION OF THE INVENTION

To carry out above the goal, the present invention provides a method for manufacturing the tube and sheet of niobium-containing zirconium alloy for high burn-up nuclear fuel, in the first step is preparing ingot containing Nb element (step 1);

in the second step of forging the ingot at β phase range (step 2);

in the third step of β-quenching the forged ingot in water after performing a solution heat-treatment at 1015–1075° C. (step 3);

in the forth step of hot-working the quenched ingot at 600–650° C. (step 4);

in the fifth step of cold-working the hot-worked billet in three to five passes, which has intermediate annealing in vacuum (step 5) between the passes, and;

in the sixth step of final annealing in vacuum at 440–600° C. (step 6).

Figure 1:
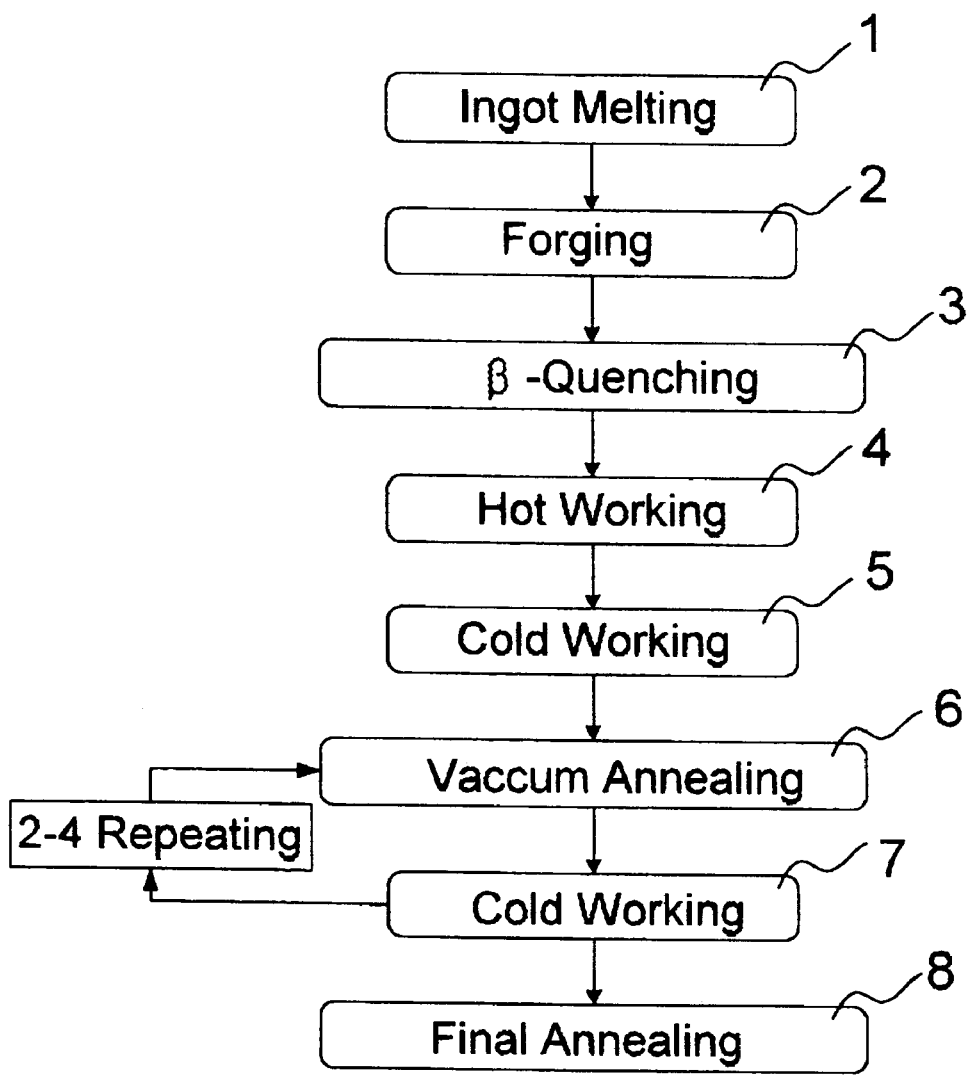
FIG. 1 is a diagram of preparation processes of the present invention.

Referring to FIG. 1, a method for manufacturing a zirconium alloy of the present invention is explained.

In a first step of ingot preparing (1), alloy elements such as Sn, Fe, Cr, Cu or Mn, O, Si in addition to Nb, are mixed and then melted, thus ingots of zirconium alloys is prepared.

In a second step of forging (2), the ingot is forged at β phase range of 1000–1200° C. to break its dendrite structure.

In a third step of β-quenching (3), solution heat-treatment of the ingot is performed at β regime of 1015–1075° C. so that alloy composition may become homogeneous and then is quenched to yield a martensite structure and Widmanstatten structure. This step is carried out for homogenizing the composition and controlling particle sizes in the alloy matrix.

In a fourth step of hot working (4), the β-quenched ingot is worked into intermediate products of a hollow billet and hot worked to prepare an extruded shell, which is suitable for cold working. At that time, the heat treatment temperature is preferably 600–650° C., more preferably 630° C.

In a fifth step of cold working (5) and intermediate vacuum annealing (6), the extruded shell prepared in the fourth step is cold-worked to prepare TREX (Tube Reduced Extrusion), which is then heat-treated in the intermediate vacuum annealing step. Such TREX is further cold worked 2–4 times (7). Through the total 3–5 times of cold working and the intermediate vacuum annealing (6) between the cold working steps, the heat-treatment time and temperature are adjusted so as to attain the condition under which precipitates are limited to a size of 80 nm or smaller. As such, the accumulated annealing parameter, $\Sigma$ A, is preferably limited to a range of $1\times10^{-18}$ hr or lower, where $\Sigma$ A is represented by the following Equation 1:

$$\Sigma A = \Sigma_i\, t_i \times \exp(-Q/RT_i) \qquad \text{Equation 1}$$

where, $t_i$ is annealing time (hr) of i-th step after β-quenching, $T_i$ is annealing temperature (K) of i-th step after β-quenching, R is gas constant, Q is activation energy and Q/R equal to about 40,000 K.

It is preferred that the intermediate annealing for forming recrystalline structure between the cold-working steps is carried out at 550–650° C. for 2–3 hours under vacuum.

Figure 2:
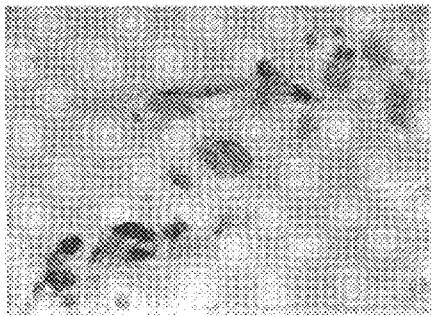
FIG. 2 is the electron microscopic microstructures of alloys for each step.

In FIG. 2, the hot working is conducted at 600–650° C. and the intermediate vacuum annealing between the cold working steps at 550–640° C. to form a recrystalline structure, for preferably 2–5 hours, and more preferably 2–8 hours. It is preferred that 0.5 wt % or lower of Nb-added alloy is at 570–620° C. for 2–3 hours, and 0.8–1.8 wt % of Nb-added alloy intermediately vacuum-annealed at 570–620° C. for 2–8 hours. As can be seen in this drawing, the microstructures observed after intermediate vacuum annealing are all in recrystallized states and the precipitates are homogeneously dispersed therein.

Figure 3:
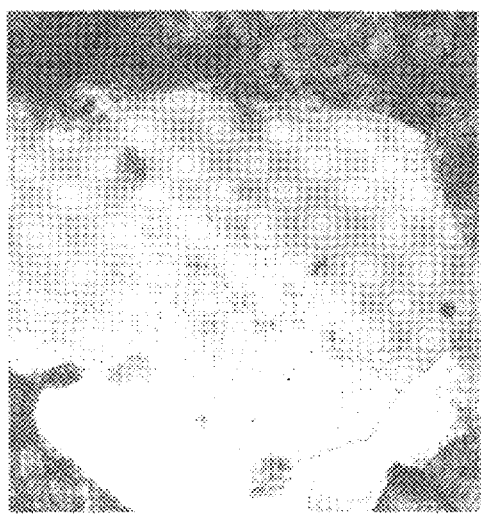
FIG. 3 is the electron microscopic microstructures of alloys according to an annealing parameter during vacuum annealing.
Figure 3:
Figure 3:

With reference to FIG. 3, microstructure of zirconium alloy comprising Nb 0.4 wt %, Sn 0.8 wt %, Fe 0.35 wt %, Cr 0.15 wt %, Mn 0.1 wt %, Si 120 ppm, O 1400 ppm and Zr the balance is observed with an electron microscope according to the accumulated annealing parameter. The size of the precipitates becomes large depending on the increase of the annealing parameter. When the annealing parameter is limited to the value of $1 \times 10^{-18}$ hr or lower, hydrogen absorption fraction in the alloy matrix is approximately 10% or less. This value is very low, compared with 25% of the commercial Zircaloy-4. Hence, controlling the annealing parameter to less than $1 \times 10^{-18}$ hr results in obtaining the precipitates with 80 nm in diameter, thereby improving corrosion resistance of the alloys used in the present invention.

Figure 4:
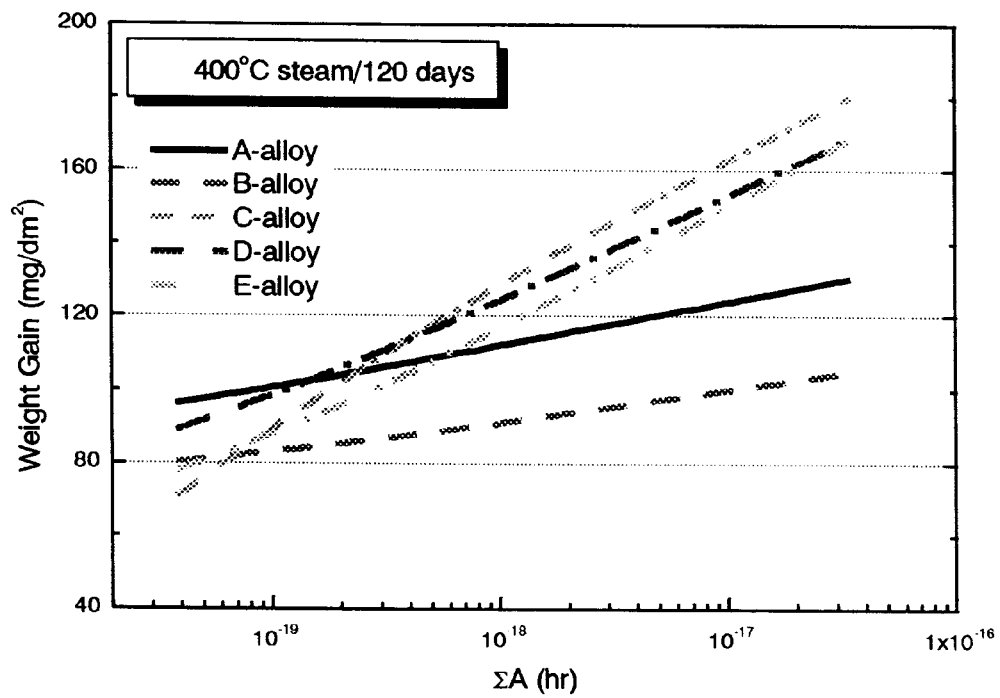
FIG. 4 is a graph showing corrosion properties of alloys according to the annealing parameter during vacuum annealing.
Figure 4:
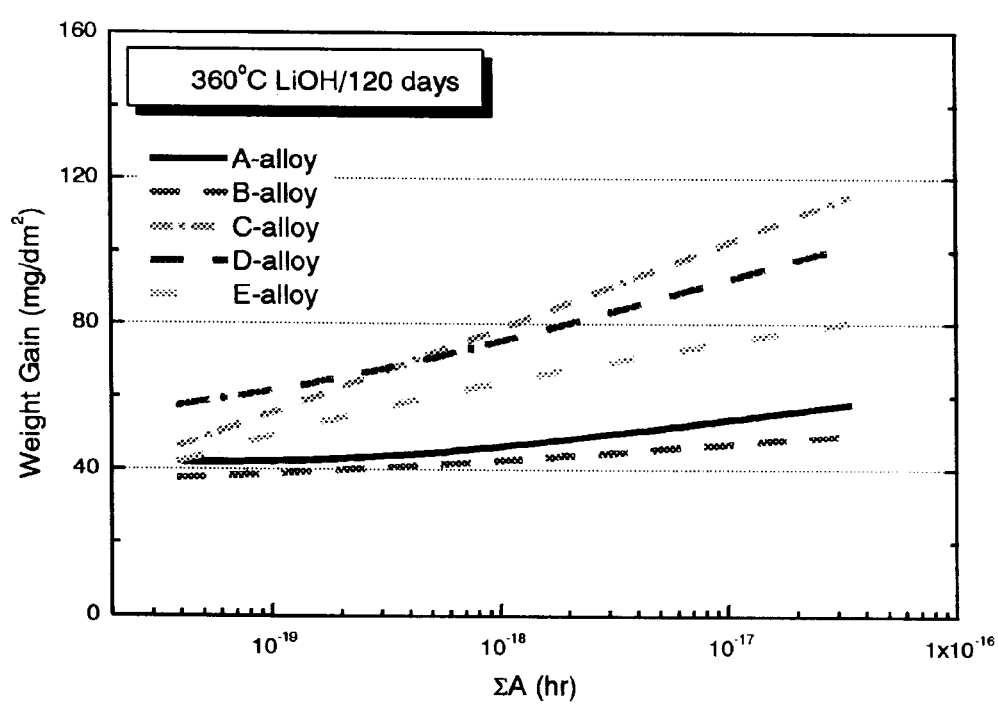

In FIG. 4, zirconium alloy comprises A, B, C, D, and E compositions (Nb 0.4 wt %, Sn 0.8 wt %, Fe 0.35 wt %, Cr 0.15 wt %, Mn 0.1 wt %, Si 120 ppm, O 1400 ppm and Zr the balance (A), Nb 0.2 wt %, Sn 1.1 wt %, Fe 0.35 wt %, Cr 0.15 wt %, Cu 0.1 wt %, Si '120 ppm, O 1400 ppm and Zr the balance (B), Nb 1.5 wt %, Sn 0.4 wt %, Fe 0.2 wt %, Cr 0.1 wt %, Si 120 ppm, O 1400 ppm and Zr the balance (C), Nb 1.0 wt %, Sn 1.0 wt %, Fe 0.3 wt %, Cr 0.1 wt %, Cu 0.1 wt %, Si 120 ppm, O 1400 ppm and Zr the balance (D), and Nb 0.4 wt %, Sn 0.8 wt %, Fe 0.35 wt %, Cr 0.15 wt %, Cu 0.1 wt %, Si 120 ppm, O 1400 ppm and Zr the balance (E)). For such zirconium alloys, corrosion tests were conducted under three conditions (360° C. water, 400° C. steam, 360° C. LiOH) for 120 days, followed by measuring the weight gain according to the annealing parameter. In all three test-conditions, the weight gain is getting large, is dependent on the increase of the annealing parameter. In conditions of 360° C. water and LiOH, it is noted that, when the annealing parameter is $1 \times 10^{-18}$ hr or lower, corrosion resistance is greatly improved.

In the sixth step of final vacuum annealing (8), it is preferred that the said TREX is treated at 440–600° C. for 2–4 hours in the final vacuum annealing step so as to yield stress relieved structure, partial recrystallization structure and full recrystallization structure. As such, 0.5 wt % or less of Nb-added alloy is annealed at 470–540° C., and 0.8–1.8 wt % of Nb-added alloy at 470–580° C.

Now turning to FIG. 5, corrosion test in zirconium alloy is performed in conditions of 360° C. LiOH for 120 days, and according to the temperature change for final vacuum annealing the results are shown in the drawing, wherein zirconium alloy is composed of each of Nb 0.4 wt %, Sn 0.8 wt %, Fe 0.35 wt %, Cr 0.15 wt %, Mn 0.1 wt %, Si 120 ppm, O 1400 ppm and Zr the balance (A); Nb 0.2 wt %, Sn 1.1 wt %, Fe 0.35 wt %, Cr 0.15 wt %, Cu 0.1 wt %, Si 120 ppm, O 1400 ppm and Zr the balance (B); Nb 1.5 wt %, Sn 0.4 wt %, Fe 0.2 wt %, Cr 0.1 wt %, Si 120 ppm, O 1400 ppm and Zr the balance (C); Nb 1.0 wt %, Sn 1.0 wt %, Fe 0.3 wt %, Cr 0.1 wt %, Cu 0.1 wt %, Si 120 ppm, O 1400 ppm and Zr the balance (D); and Nb 0.4 wt %, Sn 0.8 wt %, Fe 0.35 wt %, Cr 0.15 wt %, Cu 0.1 wt %, Si 120 ppm, O 1400 ppm and Zr the balance (E). Weight gain is reduced in accordance with temperature increase, and corrosion resistance is excellent at 470° C. or higher.

FIG. 6 shows tensile strength according to the final vacuum annealing temperature. Tensile strength is slowly reduced depending on the increase of the annealing temperature, then drastically reduced at 540° C. It is believed that the recrystallization begins at 540° C. and thus the disappearance of dislocation occurs and the grains are grown, thereby the tensile strength is drastically reducing. Therefore, it is preferred that the final vacuum annealing is carried out at 470–580° C. from a view of tensile strength.

FIG. 7 shows creep rate involved in the final vacuum annealing temperature. Creep rate increases depending on the increase of the annealing temperature. It is preferred that 0.5 wt % or less of Nb-added alloy is annealed at 470–540° C. and 0.8-1.8 wt % of Nb-added alloy at 470–580° C.

Considering corrosion resistance, tensile strength and creep rate in accordance with the final vacuum annealing temperature, the optimal annealing is conducted at 470–540° C. for 0.5 wt % or less of Nb-added alloy, and at 470–580° C. for 0.8–1.8 wt % of Nb-added alloy, thereby obtaining a tube and a sheet of Nb-added zirconium alloys for high burn-up nuclear fuel with excellent corrosion resistance and mechanical properties.

The Nb-containing zirconium alloy in this present invention is preferably composed of Nb 0.05–1.8 wt %, Sn 0.2–1.4 wt %, Fe 0.05–0.5 wt %, Cr 0.05–0.30 wt %, Mn or Cu 0.05–0.4 wt %, Si 80–120 ppm, O 600–1400 ppm and Zr the balance.

Further, it is preferred that the zirconium alloy comprises Nb 0.05–1.8 wt %, Sn 0.2–1.4 wt %, Fe 0.05–0.5 wt %, one element of Cr, Mn and Cu 0.05–0.30 wt %, Si 80–120 ppm, O 600–1400 ppm and Zr the balance.

Furthermore, it is preferred that the zirconium alloy comprises Nb 0.05–1.8 wt %, Fe or Cu 0.05–0.3 wt %, Si 80–120 ppm, O 600–1400 ppm and Zr the balance.

More preferably, niobium-containing zirconium alloy comprises

1) Nb 0.3–0.6 wt %, Sn 0.7–1.0 wt %, Fe 0.2–0.5 wt %, Cr 0.05–0.25 wt %, Mn or Cu 0.05–0.4 wt %, Si 80–120 ppm, O 600–1400 ppm and Zr the balance.

2) Nb 0.15–0.25 wt %, Sn 0.9–1.40 wt %, Fe 0.2–0.4 wt %, Cr 1.0–0.25 wt %, Cu 0.05–0.12 wt %, Si 80–120 ppm, O 600–1400 ppm and Zr the balance.

3) Nb 0.05–0.3 wt %, Sn 0.3–0.7 wt %, Fe 0.2–0.4 wt %, Cr or Cu 0.05–0.2 wt %, Si 80–120 ppm, O 600–1400 ppm and Zr the balance.

4) Nb 1.3–1.8 wt %, Sn 0.2–0.5 wt %, Fe 0.1–0.3 wt %, Cr, Mn or Cu 0.05–0.3 wt %, Si 80–120 ppm, O 600–1400 ppm and Zr the balance.

5) Nb 0.8–1.2 wt %, Sn 0.8–1.2 wt %, Fe 0.2–0.4 wt %, Cr 0.10–0.25 wt %, Mn or Cu 0.05–0.3 wt %, Si 80–120 ppm, O 600–1400 ppm and Zr the balance.

6) Nb 0.8–1.2 wt %, Fe or Cu 0.05–0.3 wt %, Si 80–120 ppm, O 600–1400 ppm and Zr the balance.

A better understanding of the present invention may be obtained in the light of the following examples which are set forth to illustrate, but are not to limit the present invention.

EXAMPLE 1

Preparation of Niobium-containing Zirconium Alloy 1

Niobium-containing zirconium alloy, comprising Nb 0.4 wt

% (deviation 0.3–0.6 wt %), Sn 0.8 wt % (deviation 0.7–1.0 wt %), Fe 0.35 wt % (deviation 0.2–0.5 wt %), Cr 0.15 wt % (deviation 0.05–0.25 wt %), Mn 0.1 wt % (deviation 0.05–0.2 wt %), Si 120 ppm (deviation 80–120 ppm), 0 1400 ppm (deviation 600–1400 ppm) and Zr the balance, was melted and thus, the ingot was formed (first step), and forging it was performed (second step) in a range of β phase of 1200° C. in order that the dendrite structures in ingot were broken. Subsequently, through β-quenching (third step) in which solution heat-treatment was conducted at 1050° C. so that alloy elements were homogeneously distributed and then quenched, martensite or Widmanstatten structure could be obtained. The β-quenched ingot was hot-worked at 630° C. (fourth step) to yield an extruded shell, suitable for cold working. The said extruded shell was cold-worked to obtain an intermediate product such as TREX (Tube Reduced Extrusion), which was then intermediate vacuum annealed at 580–640° C. for 3 hours (fifth step). Such TREX was cold-worked 2–4 times and intermediate vacuum annealing (fifth step) interposed between cold working was conducted at 570–610° C. for 2 hours each. Final vacuum annealing (sixth step) was performed at 470° C. for 2.5 hours, thereby preparing a tube and a sheet of niobium-containing zirconium alloy.

In annealing performed at a phase introduced at each step after β-quenching annealing, its holding temperature and time were represented by introducing the accumulated annealing parameter ($\Sigma A$), which was adjusted at $1.0 \times 10^{-18}$ hr or lower.

EXAMPLE 2

Preparation of Niobium-containing Zirconium Alloy 2

By the same manner as described in Example 1, prepared were a tube and a sheet of niobium-containing zirconium alloy comprising Nb 0.4 wt % (deviation 0.3–0.6 wt %), Sn 0.8 wt % (deviation 0.7–1.0 wt %), Fe 0.35 wt % (deviation 0.2–0.5 wt %), Cr 0.15 wt % (deviation 0.05–0.25 wt %), Cu 0.1 wt % (deviation 0.05–0.2 wt %), Si 120 ppm (deviation 80–120 ppm), O 1400 ppm (deviation 600–1400 ppm) and Zr the balance.

EXAMPLE 3

Preparation of Niobium-containing Zirconium Alloy 3

By the same manner as described in Example 1, prepared were a tube and a sheet of niobium-containing zirconium alloy comprising Nb 0.2 wt % (deviation 0.15–0.25 wt %), Sn 1.1 wt % (deviation 0.9–1.40 wt %), Fe 0.35 wt % (deviation 0.2–0.4 wt %), Cr 0.15 wt % (deviation 0.10–0.25 wt %), Cu 0.1 wt % (deviation 0.05–0.12 wt %), Si 120 ppm (deviation 80–120 ppm), O 1400 ppm (deviation 600–1400 ppm) and Zr the balance.

EXAMPLE 4

Preparation of Niobium-containing Zirconium Alloy 4

By the same manner as described in Example 1, prepared were a tube and a sheet of niobium-containing zirconium alloy comprising Nb 0.2 wt % (deviation 0.05–0.3 wt %), Sn 0.5 wt % (deviation 0.3–0.7 wt %), Fe 0.30 wt % (deviation 0.2–0.4 wt %), Cr 0.1 wt % (deviation 0.05–0.20 wt %), Si 120 ppm (deviation 80–120 ppm), O 1400 ppm (deviation 600–1400 ppm) and Zr the balance.

EXAMPLE 5

Preparation of Niobium-containing Zirconium Alloy 5

By the same manner as described in Example 1, prepared were a tube and a sheet of niobium-containing zirconium alloy comprising Nb 0.2 wt % (deviation 0.05–0.3 wt %), Sn 0.5 wt % (deviation 0.3–0.7 wt %), Fe 0.3 wt % (deviation 0.2–0.4 wt %), Cu 0.1 wt % (deviation 0.05–0.2 wt %), Si 120 ppm (deviation 80–120 ppm), O 1400 ppm (deviation 600–1400 ppm) and Zr the balance.

EXAMPLE 6

Preparation of Niobium-containing Zirconium Alloy 6

Niobium-containing zirconium alloy comprising, Nb 1.5 wt % (deviation 1.3–1.8 wt %), Sn 0.4 wt % (deviation 0.2–0.5 wt %), Fe 0.2 wt % (deviation 0.1–0.3 wt %), Cr 0.1 wt % (deviation 0.05–0.3 wt %), Si 120 ppm (deviation 80–120 ppm), O 1400 ppm (deviation 600–1400 ppm) and Zr the balance, was melted and thus, the ingot was formed (first step), and forging it was performed (second step) in a range of β phase of 1200° C. in order that the dendrite structures in ingot were broken. Subsequently, through β-quenching process (third step) in which solution heat-treatment was conducted in 1050° C. so that alloy elements were homogeneously distributed and then quenched, martensite or Widmanstatten structure could be obtained. The β-quenched ingot was hot-worked at 630° C. (fourth step) to yield an extruded shell, suitable for cold working. The said extruded shell was cold worked to obtain an intermediate product, such as TREX, which was then intermediate vacuum annealed at 580–640° C. for 8 hours (fifth step). Such TREX was cold-worked 2–4 times and intermediate vacuum annealing (fifth step) interposed between the cold-working steps was conducted at 570–610° C. for 3 hours each. Final vacuum annealing (sixth step) was performed at 520° C. for 2.5 hours, thereby preparing a tube and a sheet of niobium-containing zirconium alloy.

In annealing performed at a phase introduced at each step after β-quenching annealing, its holding temperature and time were represented by introducing the accumulated annealing parameter ($\Sigma A$), which was adjusted at $1.0 \times 10^{-18}$ hr or lower.

EXAMPLE 7

Preparation of Niobium-containing Zirconium Alloy 7

By the same manner as described in Example 6, a tube and a sheet of niobium-containing zirconium alloy comprising Nb 1.5 wt % (deviation 1.3–1.8 wt %), Sn 0.4 wt % (deviation 0.2–0.5 wt %), Fe 0.2 wt % (deviation 0.1–0.3 wt %), Mn 0.1 wt % (deviation 0.05–0.3 wt %), Si 120 ppm (deviation 80–120 ppm), 0 1400 ppm (deviation 600–1400 ppm) and Zr the balance, were prepared.

EXAMPLE 8

Preparation of Niobium-containing Zirconium Alloy 8

By the same manner as described in Example 6, a tube and a sheet of niobium-containing zirconium alloy comprising Nb 1.5 wt % (deviation 1.3–1.8 wt %), Sn 0.4 wt % (deviation 0.2–0.5 wt %), Fe 0.2 wt % (deviation 0.1–0.3 wt %), Cu 0.1 wt % (deviation 0.05–0.3 wt %), Si 120 ppm (deviation 80–120 ppm), O 1400 ppm (deviation 600–1400 ppm) and Zr the balance, were prepared.

EXAMPLE 9

Preparation of Niobium-containing Zirconium Alloy 9

By the same manner as described in Example 6, a tube and a sheet of niobium-containing zirconium alloy comprising Nb 1.0 wt % (deviation 0.8–1.2 wt %), Sn 1.0 wt % (deviation 0.8–1.2 wt %), Fe 0.3 wt % (deviation 0.20 (deviation 0.10–0.25 wt %), Mn 0.10 wt % (deviation 0.05–0.30 wt %), Si 120 ppm (deviation 80–120 ppm), O 1400 ppm (deviation 600–1400 ppm) and Zr the balance, were prepared.

EXAMPLE 10

Preparation of Niobium-containing Zirconium Alloy 10

By the same manner as described in Example 6, a tube and a sheet of niobium-containing zirconium alloy comprising Nb 1.0 wt % (deviation 0.8–1.2 wt %), Sn 1.0 wt % (deviation 0.8–1.2 wt %), Fe 0.3 wt % (deviation 0.2–0.4 wt %), Cr 0.10 wt % (deviation 0.10–0.25 wt %), Cu 0.10 wt % (deviation 0.05–0.30 wt %), Si 120 ppm (deviation 80–120 ppm), O 1400 ppm (deviation 600–1400 ppm) and Zr the balance, were prepared.

EXAMPLE 11

Preparation of Niobium-containing Zirconium Alloy 11

By the same manner as described in Example 6, a tube and a sheet of niobium-containing zirconium alloy comprising Nb 1.0 wt % (deviation 0.8–1.2 wt %), Fe 0.15 wt % (deviation 0.05–0.30 wt %), Si 120 ppm (deviation 80–120 ppm), O 1400 ppm (deviation 600–1400 ppm) and Zr the balance, were prepared.

EXAMPLE 12

Preparation of Niobium-containing Zirconium Alloy 12

By the same manner as described in Example 6, a tube and a sheet of niobium-containing zirconium alloy comprising Nb 1.0 wt % (deviation 0.8–1.2 wt %), Cu 0.15 wt % (deviation 0.05–0.30 wt %), Si 120 ppm (deviation 80-120 ppm), O 1400 ppm (deviation 600–1400 ppm) and Zr the balance, were prepared.

EXAMPLE 13

Preparation of Niobium-containing Zirconium Alloy 13

By the same manner as describea in Example 6, a tube and a sheet of niobium-containing zirconium alloy comprising Nb 1.0 wt % (deviation 1.3–1.8 wt %), Fe 0.15 wt % (deviation 0.05–0.30 wt %), Cu 0.15 wt % (deviation 0.05–0.30 wt %), Si 120 ppm (deviation 80–120 ppm), O 1400 ppm (deviation 600–1400 ppm) and Zr the balance, were prepared.

Experimental Example 1

Observation of Microstructure of Alloys

Observing the microstructure of alloys prepared in the examples 1–13 by use of an optical microscope and a transmission electron microscope, it was found that the intermediate microstructures between the cold-working steps were all recrystallized states. Nb-contained zirconium alloy had larger crystalline grains than that of Zircaloy-4, and the crystalline grains became coarse according to the increase of Nb contents. Nb was added so that the recrystallizing temperature was slightly reduced. Intermediate vacuum annealing conditions between the cold-working steps were suitable for recrystallizing Nb-containing zirconium alloy. In order to control the size of the precipitates at 80 nm or smaller, intermediate vacuum annealing between the cold-working steps was preferably conducted at 620° C. or lower. As such, accumulated annealing parameter ($\Sigma$ A) was $1.0 \times 10^{-18}$ hr or lower.

Experimental Example 2

Corrosion Test

To investigate corrosion resistance of alloys prepared in the examples 1–13, corrosion tests were performed in three conditions of water (18.9 MPa) of 360° C., steam atmosphere (10.3 MPa) of 400° C. and 70 ppm aqueous LiOH solution of 360° C. for 120 days. A tube and a sheet were processed to corrosion test pieces, polished with #1200 SiC polishing paper to have the same surface conditions, and then ultrasonically cleaned, followed by rinsing with a mixed acid solution of HF (5%)+$HNO_3$ (45%)+$H_2O$ (50%). Test pieces were periodically taken out of autoclave and the weight gain attributed to corrosion was measured, thereby evaluating corrosion resistance.

For the Alloy-2 and Alloy-6 of the previous Example 2 and 6, the corrosion resistance with the change of hot-working, intermediate annealing, and final annealing was evaluated in 360° C. water as shown in FIG. 8. When hot-working at a temperature of higher than 650° C., the weight gain of the both alloys increased gradually. The temperature of intermediate annealing and final annealing had the optimal range to obtain the excellent corrosion resistance. Thus the intermediate annealing of the alloys should be carried out in the range of 570° C. to 620° C. The Alloy-2 (less than 5% Nb-containing alloy) should be final annealed in the range of 470° C. to 540° C., and the Alloy-6 (more than 5% Nb-containing alloy) in the range of 470° C. to 580° C.

In the case that the accumulated annealing parameter for 13 alloys in the said examples was $\times 10^{-19}$ hr, weight gain after corrosion test for 120 days is shown in the following table 1, and Zircaloy-4 was used as a comparative example.

TABLE 1

| | Weight gain of Nb-containing zirconium alloy, $mg/dm^2$ | | | | | |
|---|---|---|---|---|---|---|
| | 360° C. water | | 400° C. steam | | 360° C. 70 ppm LiOH | |
| Alloy | tube | sheet | tube | sheet | tube | sheet |
| Example 1 | 33 | 27 | 60 | 55 | 32 | 26 |
| Example 2 | 29 | 26 | 56 | 53 | 30 | 26 |
| Example 3 | 28 | 27 | 57 | 55 | 31 | 30 |
| Example 4 | 26 | 24 | 52 | 50 | 27 | 27 |
| Example 5 | 27 | 24 | 50 | 48 | 25 | 24 |
| Example 6 | 35 | 30 | 55 | 56 | 37 | 29 |
| Example 7 | 34 | 34 | 54 | 59 | 35 | 32 |
| Example 8 | 37 | 36 | 55 | 54 | 37 | 33 |
| Example 9 | 36 | 31 | 54 | 56 | 36 | 27 |
| Example 10 | 34 | 32 | 55 | 58 | 35 | 34 |

TABLE 1-continued

Weight gain of Nb-containing zirconium alloy, mg/dm²

| Alloy | 360° C. water | | 400° C. steam | | 360° C. 70 ppm LiOH | |
|---|---|---|---|---|---|---|
| | tube | sheet | tube | sheet | tube | sheet |
| Example 11 | 35 | 33 | 56 | 58 | 34 | 32 |
| Example 12 | 36 | 34 | 58 | 56 | 35 | 36 |
| Example 13 | 34 | 34 | 58 | 57 | 36 | 34 |
| Zircaloy-4 | 37 | 39 | 65 | 62 | 60 | 62 |

From the results of table 1, it can be seen that zirconium alloys of the present invention have superior corrosion properties to those of the commercial Zircaloy-4 in the said three conditions uf corrosion test, and, in particular, corrosion resistance is excellent in 70 ppm aqueous LIOH solution.

Experimental Example 3
Tensile Test

To investigate th e tensile strength of alloys prepared in the examples 1–13, tensile tests were conducted at room temperature (25° C.) and high temperature (400° C.) according to ASTM-E8 standard by use of a 10 ton multi-purpose tester. All the test pieces prepared by changing intermediate vacuum annealing temperature and final vacuum annealing temperature were measured for their tensile properties. As such, Zircaloy-4 was used in comparative example.

TABLE 2

Strength of Nb-containing zirconium alloy, MPa

| | Room temp. (25° C.) | | | | High temp. (40° C.) | | | |
|---|---|---|---|---|---|---|---|---|
| | yielding strength | | tensile strength | | yielding strength | | tensile strength | |
| Alloy | tube | sheet | tube | sheet | tube | sheet | Tube | sheet |
| Example 1 | 550 | 569 | 782 | 776 | 342 | 352 | 402 | 381 |
| Example 2 | 555 | 574 | 779 | 765 | 340 | 348 | 408 | 392 |
| Example 3 | 550 | 594 | 780 | 789 | 340 | 350 | 401 | 398 |
| Example 4 | 530 | 533 | 700 | 703 | 335 | 340 | 378 | 390 |
| Example 5 | 528 | 534 | 698 | 705 | 338 | 348 | 380 | 399 |
| Example 6 | 572 | 626 | 817 | 824 | 356 | 358 | 418 | 412 |
| Example 7 | 570 | 630 | 809 | 819 | 352 | 360 | 415 | 413 |
| Example 8 | 575 | 628 | 811 | 820 | 349 | 355 | 409 | 406 |
| Example 9 | 570 | 619 | 820 | 821 | 348 | 351 | 407 | 410 |
| Example 10 | 572 | 615 | 822 | 824 | 350 | 357 | 412 | 413 |
| Example 11 | 520 | 522 | 731 | 740 | 298 | 306 | 358 | 542 |
| Example 12 | 505 | 523 | 723 | 743 | 296 | 289 | 348 | 336 |
| Example 13 | 518 | 526 | 728 | 738 | 301 | 294 | 351 | 340 |
| Zircaloy-4 | 506 | 495 | 682 | 685 | 126 | 122 | 225 | 223 |

As can be seen in table 2, it was found that the strength of specimens controlled to the annealing parameter of ×10⁻19 hr were equal to or better in tensile strength properties than those of Zircaloy-4, and tensile properties of alloys of the present invention are superior to those of Zircaloy-4.

Experimental Example 4
Creep Test

To investigate the creep rate of alloys prepared in the examples 1–13, creep tests were conducted at 400° C. for 240 days under constant load of 150 MPa. The test result of alloys of the present invention was compared with that of the commercial Zircaloy-4.

After the tests were completed, a secondary creep regime (steady state regime) in creep curve was evaluated through data analysis and then creep rate was measured by use of the least squares method. The measured creep rate of Nb-containing zirconium alloy is superior to that of Zircaloy-4, which was taken as a standard for analysis of creep resistance.

TABLE 3

| | Creep rate of Nb-containing zirconium alloy, $\times 10^{-7}$%/sec | |
|---|---|---|
| Alloy | tube | sheet |
| Example 1 | 5 | 8 |
| Example 2 | 8 | 12 |
| Example 3 | 0.9 | 1 |
| Example 4 | 13 | 12 |
| Example 5 | 10 | 9 |
| Example 6 | 1 | 4 |
| Example 7 | 3 | 3 |
| Example 8 | 2 | 4 |
| Example 9 | 0.9 | 5 |
| Example 10 | 1 | 6 |
| Example 11 | 12 | 16 |
| Example 12 | 15 | 19 |
| Example 13 | 12 | 15 |
| Zircaloy-4 | 18 | 23 |

From the result in table 3, it is shown that Nb-added zirconium alloy of the present invention has lower creep rate than that of the commercial Zircaloy-4, thus having excellent creep resistance. In addition, zirconium alloy of the present invention, controlled to the annealing parameter of $7 \times 10^{-19}$ hr, is excellent in creep properties.

Accordingly, 0.05–1.8 wt % of Nb-added zirconium alloys selectively comprising Sn, Fe, Cr, Cu, and Mn, prepared by the method of the present invention, can have excellent corrosion resistance and mechanical properties by controlling the annealing conditions (relatively low annealing temperature). Such Nb-containing zirconium alloy composition can be stably maintained in the operation conditions of high burn-up/extended cycle, thereby being useful as nuclear fuel cladding tubes, grids and reactor structures in the core components of light water reactors and heavy water reactors.

The present invention has been described in an illustrative manner, and it is to be understood that the terminology used is intended to be in the nature of description rather than of limitation. Many modifications and variations of the present invention are possible in the light of the above teachings. Therefore, it is to be understood that within the scope of the appended claims, the invention may be practiced otherwise than as specifically described.

What is claimed is:

1. A method for manufacturing a tube or a sheet of niobium-containing zirconium alloys for the high burn up nuclear fuel, comprising the following steps of:

melting a metal mixture comprising of zirconium and alloying elements to obtain a ingot of a Nb-containing zirconium alloy comprising Nb 0.3–0.6 wt %, Sn 0.7–1.0 wt %, Fe 0.2–0.5 wt %, Cr 0.05–0.25 wt %, one element of Mn and Cu 0.05–0.4 wt %, Si 80–120 ppm, O 600–1400 ppm and Zr the balance (first step);

forging the ingot in the β phase range (second step);

β-quenching the forged ingot after performing a solution heat-treatment at 1015–1075° C. (third step);

hot-working the quenched billet at 600–650° C. (fourth step);

cold-working the hot-worked ingot three to five times, with intermediate vacuum annealing (fifth step); and final vacuum annealing the cold-worked billet at 440–600° C. (sixth step), wherein cooling rate on β-quenching, and temperatures of intermediate vacuum annealing and final vacuum annealing at α phase range after the β-quenching are changed so as to attain the condition under which precipitates in the alloy matrix are limited to an average diameter of 80 nm or smaller and the accumulated annealing parameter, represented by the following equation 1 (Σ A), is limited to $1.0 \times 10^{-18}$ hr or lower:

$$\Sigma A = \Sigma_i t_i \times \exp(-Q/RT_i) \quad \text{Equation 1}$$

where, $t_i$ is annealing time (hr) of i-th annealing step after β-quenching, $T_i$ is annealing temperature (K) of i-th annealing step after β-quenching, R is gas constant, Q is activation energy and Q/R equals about 40,000 K.

2. A method for manufacturing a tube or a sheet of niobium-containing zirconium alloys for the high burn up nuclear fuel, comprising the following steps of:

melting a metal mixture comprising of zirconium and alloying elements to obtain a ingot of a Nb-containing zirconium alloy comprising Nb 0.15–0.25 wt %, Sn 0.9–1.40 wt %, Fe 0.2–0.4 wt %, Cr 0.10–0.25 wt %, Cu 0.05–0.12 wt %, Si 80–120 ppm, O 600–1400 ppm and Zr the balance (first step);

forging the ingot in the β phase range (second step);

β-quenching the forged ingot after performing a solution heat-treatment at 1015–1075° C. (third step);

hot-working the quenched billet at 600–650° C. (fourth step);

cold-working the hot-worked ingot three to five times, with intermediate vacuum annealing (fifth step); and final vacuum annealing the cold-worked billet at 440–600° C. (sixth step), wherein cooling rate on β-quenching, and temperatures of intermediate vacuum annealing and final vacuum annealing at α phase range after the β-quenching are changed so as to attain the condition under which precipitates in the alloy matrix are limited to an average diameter of 80 nm or smaller and the accumulated annealing parameter, represented by the following equation 1 (Σ A), is limited to $1.0 \times 10^{-18}$ hr or lower:

$$A = \Sigma_i t_i \times \exp(-Q/RT_i) \quad \text{Equation 1}$$

where, $t_i$ is annealing time (hr) of i-th annealing step after β-quenching, $T_i$ is annealing temperature (K) of i-th annealing step after β-quenching, R is gas constant, Q is activation energy and Q/R equals about 40,000 K.

3. A method for manufacturing a tube or a sheet of niobium-containing zirconium alloys for the high burn up nuclear fuel, comprising the following steps of:

melting a metal mixture comprising of zirconium and alloying elements to obtain a ingot of a Nb-containing zirconium alloy comprising Nb 0.05–0.3 wt %, Sn 0.3–0.7 wt %, Fe 0.2–0.4 wt %, one element of Cr and Cu 0.05–0.2 wt %, Si 80–120 ppm, O 600–1400 ppm and Zr the balance (first step);

forging the ingot in the β phase range (second step);

β-quenching the forged ingot after performing a solution heat-treatment at 1015–1075° C. (third step);

hot-working the quenched billet at 600–650° C. (fourth step);

cold-working the hot-worked ingot three to five times, with intermediate vacuum annealing (fifth step); and final vacuum annealing the cold-worked billet at 440–600° C. (sixth step), wherein cooling rate on β-quenching, and temperatures of intermediate vacuum annealing and final vacuum annealing at α phase range after the β-quenching are changed so as to attain the condition under which precipitates in the alloy matrix are limited to an average diameter of 80 nm or smaller and the accumulated annealing parameter, represented by the following equation 1 (Σ A), is limited to $1.0 \times 10^{-18}$ hr or lower:

$$\Sigma A = \Sigma_i t_i \times \exp(-Q/RT_i) \quad \text{Equation 1}$$

where, $t_i$ is annealing time (hr) of i-th annealing step after β-quenching, $T_i$ is annealing temperature (K) of i-th annealing step after β-quenching, R is gas constant, Q is activation energy and Q/R equals about 40,000 K.

4. A method for manufacturing a tube or a sheet of niobium-containing zirconium alloys for the high burn up nuclear fuel, comprising the following steps of:

melting a metal mixture comprising of zirconium and alloying elements to obtain a ingot of a Nb-containing zirconium alloy comprising Nb 1.3–1.8 wt %, Sn 0.2–0.5 wt %, Fe 0.1–0.3 wt %, one element of Cr, Mn and Cu 0.05–0.3 wt %, Si 80–120 ppm, O 600–1400 ppm and Zr the balance (first step);

forging the ingot in the β phase range (second step);

β-quenching the forged ingot after performing a solution heat-treatment at 1015–1075° C. (third step);

hot-working the quenched billet at 600–650° C. (fourth step);

cold-working the hot-worked ingot three to five times, with intermediate vacuum annealing (fifth step); and final vacuum annealing the cold-worked billet at 440–600° C. (sixth step), wherein cooling rate on β-quenching, and temperatures of intermediate vacuum annealing and final vacuum annealing at α phase range after the β-quenching are changed so as to attain the condition under which precipitates in the alloy matrix are limited to an average diameter of 80 nm or smaller and the accumulated annealing parameter, represented by the following equation 1 (Σ A), is limited to $1.0 \times 10^{-18}$ hr or lower:

$$\Sigma A = \Sigma_i t_i \times \exp(-Q/RT_i) \quad \text{Equation 1}$$

where, $t_i$ is annealing time (hr) of i-th annealing step after β-quenching, $T_i$ is annealing temperature (K) of i-th annealing step after β-quenching, R is gas constant, Q is activation energy and Q/R equals about 40,000 K.

5. A method for manufacturing a tube or a sheet of niobium-containing zirconium alloys for the high burn up nuclear fuel, comprising the following steps of:

melting a metal mixture comprising of zirconium and alloying elements to obtain a ingot of a Nb-containing zirconium alloy comprising Nb 0.8–1.2 wt %, Sn 0.8–1.2 wt %, Fe 0.2–0.4 wt %, Cr 0.10–0.25 wt %, one element of Mn and Cu 0.05–0.3 wt %, Si 80–120 ppm, O 600–1400 ppm and Zr the balance (first step);

forging the ingot in the β phase range (second step);

β-quenching the forged ingot after performing a solution heat-treatment at 1015–1075° C. (third step);

hot-working the quenched billet at 600–650° C. (fourth step);

cold-working the hot-worked ingot three to five times, with intermediate vacuum annealing (fifth step); and final vacuum annealing the cold-worked billet at 440–600° C. (sixth step), wherein cooling rate on β-quenching, and temperatures of intermediate vacuum annealing and final vacuum annealing at α phase range after the β-quenching are changed so as to attain the condition under which precipitates in the alloy matrix are limited to an average diameter of 80 nm or smaller and the accumulated annealing parameter, represented by the following equation 1 (Σ A), is limited to $1.0 \times 10^{-18}$ hr or lower:

$$\Sigma A = \Sigma_i t_i \times \exp(-Q/RT_i) \quad \text{Equation 1}$$

where, $t_i$ is annealing time (hr) of i-th annealing step after β-quenching, $T_i$ is annealing temperature (K) of i-th annealing step after β-quenching, R is gas constant, Q is activation energy and Q/R equals about 40,000 K.

6. A method for manufacturing a tube or a sheet of niobium-containing zirconium alloys for the high burn up nuclear fuel, comprising the following steps of:

melting a metal mixture comprising of zirconium and alloying elements to obtain a ingot of a Nb-containing zirconium alloy comprising Nb 0.8–1.2 wt %, Fe or Cu 0.05–0.3 wt %, Si 80–120 ppm, O 600–1400 ppm and Zr the balance (first step);

forging the ingot in the β phase range (second step);

β-quenching the forged ingot after performing a solution heat-treatment at 1015–1075° C. (third step);

hot-working the quenched billet at 600–650° C. (fourth step);

cold-working the hot-worked ingot three to five times, with intermediate vacuum annealing (fifth step); and final vacuum annealing the cold-worked billet at 440–600° C. (sixth step), wherein cooling rate on β-quenching, and temperatures of intermediate vacuum annealing and final vacuum annealing at α phase range after the β-quenching are changed so as to attain the condition under which precipitates in the alloy matrix are limited to an average diameter of 80 nm or smaller and the accumulated annealing parameter, represented by the following equation 1 (Σ A), is limited to $1.0 \times 10^{-18}$ hr or lower:

$$\Sigma A = \Sigma_i t_i \times \exp(-Q/RT_i) \quad \text{Equation 1}$$

where, $t_i$ is annealing time (hr) of i-th annealing step after β-quenching, $T_i$ is annealing temperature (K) of i-th annealing step after β-quenching, R is gas constant, Q is activation energy and Q/R equals about 40,000 K.

7. The method as defined in any one claim of claims 1 to 6, wherein the Nb-containing zirconium alloys are hot-worked at 630° C.

8. The method as defined in any one claim of claims 1 to 3, wherein the Nb-containing zirconium alloys are treated at 570–620° C. for 2–3 hours in the intermediate vacuum annealing between the cold-working steps.

9. The method as defined in any one claim of claims 1 to 3, wherein the Nb-containing zirconium alloys are treated at 470–540° C. in the final vacuum-annealing step.

10. The method as defined in any one claim of claims 4 to 6, wherein the Nb-containing zirconium alloys are treated at 570–620° C. for 3–8 hours in the intermediate vacuum annealing between the cold-working steps.

11. The method as defined in any one claim of claims 4 to 6, wherein the Nb-containing zirconium alloys are treated at 470–580° C. in the final vacuum-annealing step.

* * * * *

UNITED STATES PATENT AND TRADEMARK OFFICE
CERTIFICATE OF CORRECTION

PATENT NO.    : 6,514,360 B2
DATED         : February 3, 2003
INVENTOR(S)   : Yong Hwan Jeong et al.

It is certified that error appears in the above-identified patent and that said Letters Patent is hereby corrected as shown below:

<u>Title page,</u>
Item [73], please correct the Assignee, "Korea Atomic Energy Reserach Institute" to -- Korea Atomic Energy Research Institute --.

<u>Column 13,</u>
Line 14, "ti" should be corrected to -- $t_i$ --.
Line 45, -- $\Sigma$ -- should be inserted before the "A".

Signed and Sealed this

Ninth Day of September, 2003

JAMES E. ROGAN
*Director of the United States Patent and Trademark Office*